April 15, 1930.　　J. R. BLACKHALL　　1,754,783
STEP
Filed May 9, 1927　　2 Sheets-Sheet 1
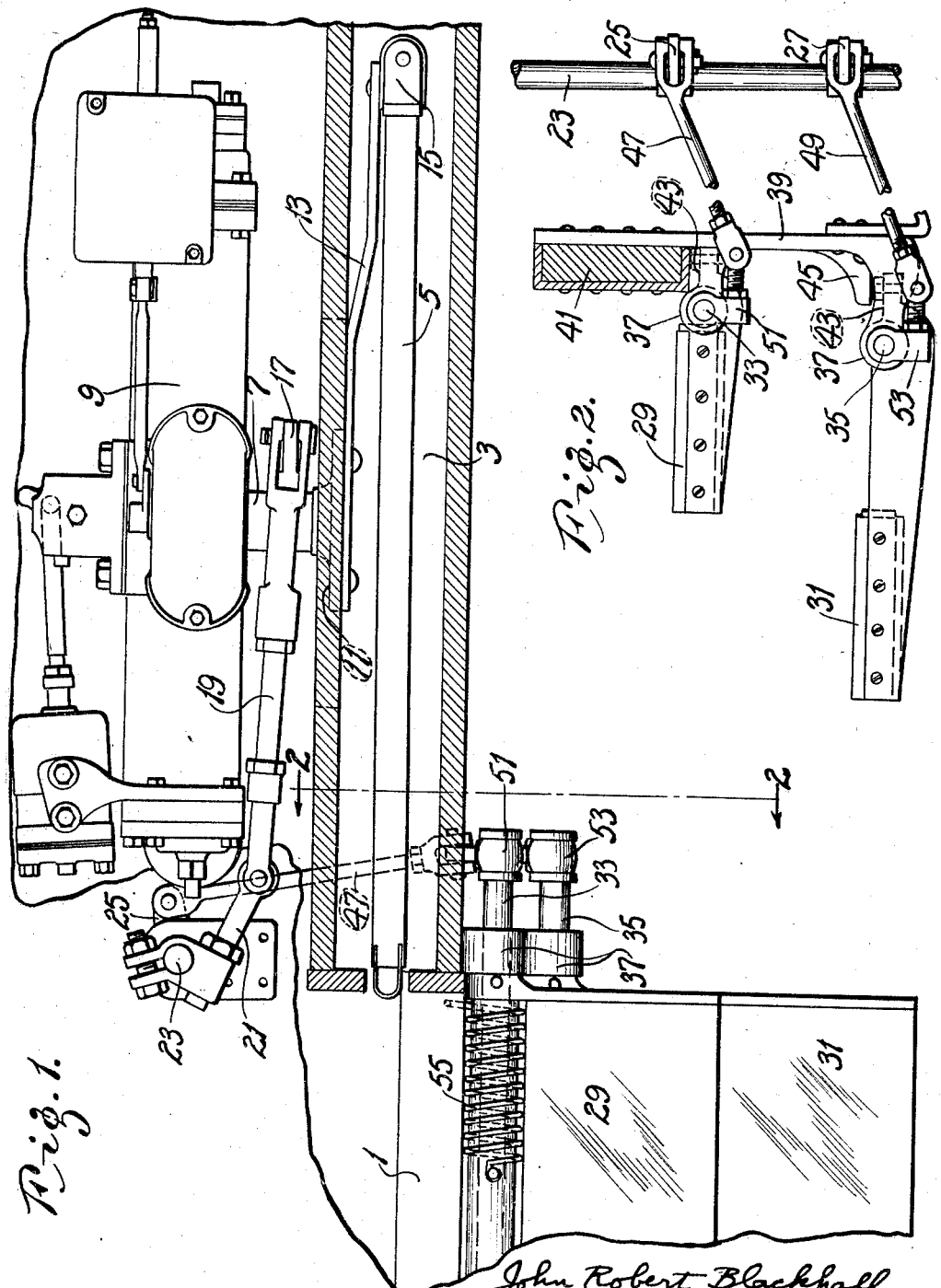

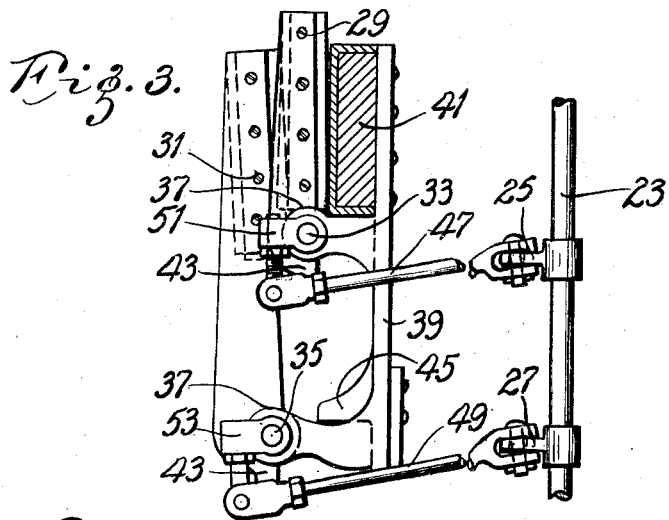
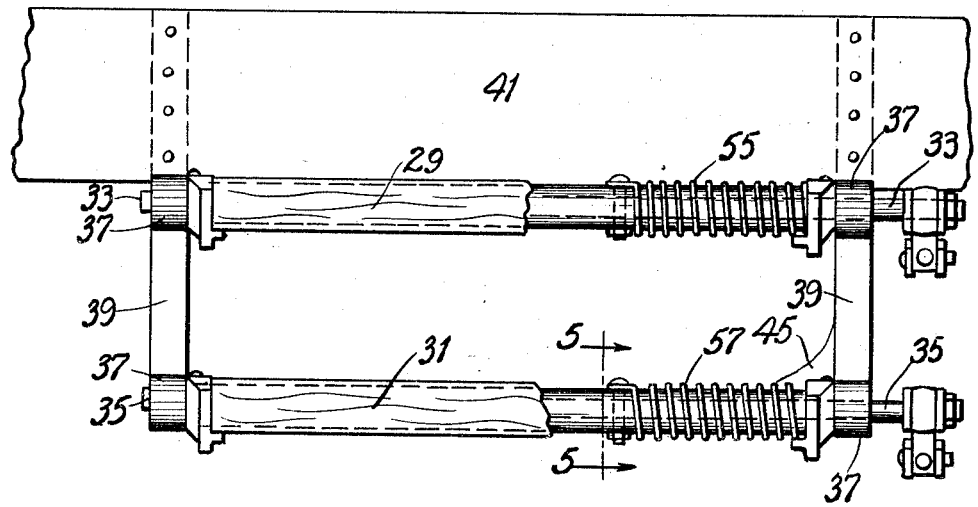
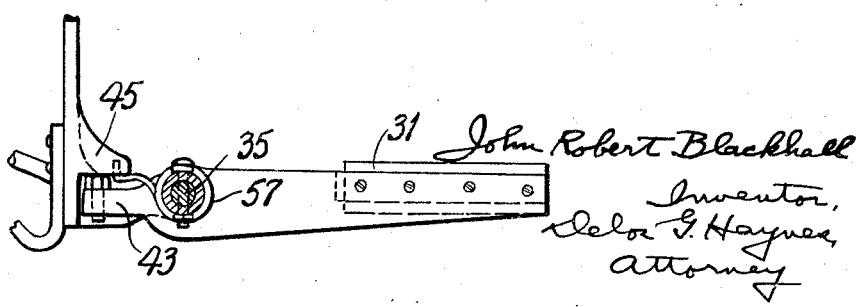

Patented Apr. 15, 1930

1,754,783

UNITED STATES PATENT OFFICE

JOHN ROBERT BLACKHALL, OF JOLIET, ILLINOIS

STEP

Application filed May 9, 1927. Serial No. 189,869.

This invention relates to steps and with regard to certain more specific features, to folding steps for vehicles and the like.

Among the several objects of the invention may be noted the provision of a compound, folding step adapted to eliminate excessive height per step, for a relatively large ascent, without the use of a door well; the provision of a step of the class described adapted to be operated from a single driving source; the provision of a step of the class described which folds into a neat, compact and safe position when closed; and the provision of a device of the class described which is simple in construction, light in weight but exceedingly rugged and strong, and one which may be economically fabricated and which may be operated without great increase of power over that required for operating the old style of step. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a plan view of the step operating linkages, parts being broken away;

Fig. 2 is a fragmentary section on a reduced scale, taken approximately on line 2—2 of Fig. 1 showing the step in open position;

Fig. 3 is a view similar to Fig. 2 but shows the step in closed position;

Fig. 4 is a side elevation of the step, parts being broken away; and,

Fig. 5 is a fragmentary section taken on line 5—5 of Fig. 4.

Corresponding reference characters indicate corresponding parts throughout the several views of the drawings.

The present invention is adapted to provide a particularly accessible entrance to a vehicle, without a passenger being required to negotiate an excessive height per step upon entering said vehicle. At the same time, the invention eliminates the door well, often used inside of car doors and the like. It is applicable to front, side or rear entrances on either side of the car or at the ends thereof. The drawings show the invention applied to a rear entrance but it is to be understood that this showing is merely by way of illustration, as any other entrance might have the invention applied thereto.

Referring now more particularly to Fig. 1, there is illustrated at numeral 1 a car entrance, devoid of the ordinary door well. Door wells are often used where the platform is relatively high above the rails.

At the right of the entrance 1 is illustrated the conventional door pocket 3 into which the door 5 slides when opened and from which the door slides when closed across the car entrance 1. The door is illustrated as being of the sliding type but any other type might be used equally well. The door 5 is made operable to open and close by the oscillations of a rock shaft 7, operable from a conventional door engine 9. The engine 9 is under control of an operator.

The operation of the door engine 9 in moving the door is conventional. A plate 11, fastened to the rock shaft 7, is provided with an arm 13 which oscillates from the more or less horizontal position shown in Fig. 1 to a vertical position or beyond. The arm 13 controls the movement of the door 5 by way of a conventional vertical slider mechanism 15.

In the present invention the rock shaft 7 is made the source of power for operating the folding step, so that the steps may be opened when the door is opened and closed when the door is closed. This is accomplished by a crank 17 on the rock shaft 7 and an adjustable connecting rod 19 linked to said crank 17 and to the crank 21 of a secondary vertical rock shaft 23. The secondary shaft 23 is borne in a floor bearing and extends downwardly beneath the car, where it is provided with two laterally extending arms 25 and 27 (Fig. 2).

The upper arm 25 is adapted to operate an upper step 29 and the lower arm 27 is adapted to operate a lower step 31. The steps 29 and 31 are fastened to supporting shafts 33 and 35 respectively. The shafts 33 and 35 are rotatably borne in suitable bearings 37 of step brackets 39, the latter being fastened to the car framework 41 and forming a frame for the step as a whole. It may be noted incidentally, that this manner of supporting the steps eliminates the offset or break required in the framework member 41, such as is usually required where a door well is used.

The steps are provided with rearwardly projecting and adjustable stops 43. The stop of the lower step 31 is adapted to engage a lug 45 on one of the brackets 39 and the stop of the upper step 29 is adapted to engage the framework 41. The purpose of these stops is to positively maintain the steps in a predetermined position when opened (preferably horizontally).

The steps 29 and 31 are operated from the arms 25 and 27 respectively. This is done by means of connecting rods 47 and 49, which rods link said respective arms 25 and 27 with arms 51 and 53 on the step shafts 33 and 35. The result is, that when the secondary rock shaft 23 is positioned as illustrated in Figs. 1 and 2, then the steps 29 and 31 are open and in the horizontal position shown. At this time the door engine 9 is so positioned that the door 5 is open.

When the door engine 9 is caused to shut the door 5, its rock shaft 7 also manipulates the door linkage so that said linkage assumes the position shown in Fig. 3. Under these conditions the secondary rock shaft 23 has been moved in a manner such that the steps are thrown into a substantially vertical position. In order to save space and increase the safety of the steps, the lower step shaft 35 is placed somewhat forwardly of the upper step shaft 33, thereby providing means whereby the steps 29 and 31 are placed in a substantially parallel arrangement against the side of the car.

It is evident from the drawings that the reach of the tread of the step 31 is made greater than that of the step 29. By this means a suitable slanting step rise is obtained when the steps are opened and at the same time a compact formation when the steps are closed.

It is to be understood that, as in all link work of this general class, the link work used herein has pivotal connections which have enough side play to permit the kinematic movements described.

In order to relieve the door engine 9 of the full work of lifting the weights of the steps 29 and 31 at each operation, counter-balancing springs 55 and 57 are fastened to and wound around the shafts 33 and 35 respectively. These springs react from suitable points stationary with respect to the framework 41, such as for example the lug 45 in the case of the lower step, such that their reactions tend to overcome the weights of the steps. Hence the door engine 9 needs only to drive the step linkage substantially against its own friction. The springs serve to counter-balance the step weights.

The operation of the device is as follows:

In open position of the door 5 the door engine has moved so that the step linkage is thrown into its position shown in Figs. 1 and 2. The steps are then open.

In the closed position of the door 5, the door engine has moved so that the step linkage is thrown into its position shown in Fig. 3. The steps are then closed and folded into a compact and safe arrangement shown.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. The compound folding step comprising two steps hinged below an entrance, means for simultaneously folding said steps from extended positions to folded positions and means for separately counter-balancing the weight of each step.

2. The compound folding step comprising supporting means, a pair of steps rotatably mounted in said supporting means, one above the other, the upper step being smaller than the lower step, means for rotating said steps from spaced parallel unfolded positions to juxtaposed parallel folded positions, means for positively stopping the steps in a predetermined unfolded position and means for substantially counter-balancing the weight of said steps, said last-named means being independently operable on each step.

3. The compound folding step comprising supporting means, a pair of steps rotatably mounted in said supporting means, one above the other, the upper step being smaller than the lower step, means for rotating said steps from spaced parallel unfolded positions to juxtaposed parallel folded positions, means for positively stopping the steps in a predetermined unfolded position and means for substantially counter-balancing the weight of said steps, said last-named means being independently operable on each step and comprising a spring on each step reacting between the respective step and said supporting means.

In testimony whereof, I have signed my name to this specification this 28th day of April, 1927.

JOHN ROBERT BLACKHALL.